United States Patent [19]

Sellers et al.

[11] Patent Number: 4,884,412
[45] Date of Patent: Dec. 5, 1989

[54] COMPRESSOR SLUGGING PROTECTION DEVICE AND METHOD THEREFOR

[76] Inventors: William Sellers, P.O. Box 3453, Boise, Id. 83703; Terry Garrison, 2700 Claremont Dr., Fort Collins, Colo. 80526

[21] Appl. No.: 244,306

[22] Filed: Sep. 15, 1988

[51] Int. Cl.$^4$ .............................................. F04B 23/04
[52] U.S. Cl. ........................................ 62/115; 62/129; 417/63; 73/593
[58] Field of Search .............. 62/125, 129, 115, 228.1; 417/63; 73/593

[56] References Cited

U.S. PATENT DOCUMENTS

| | | | |
|---|---|---|---|
| 3,269,320 | 8/1966 | Tilley et al. | 417/63 |
| 3,766,747 | 10/1973 | Parker | 62/129 X |
| 4,265,603 | 5/1981 | Chiyoda et al. | 417/63 X |
| 4,336,001 | 6/1982 | Andrew et al. | 417/63 |

FOREIGN PATENT DOCUMENTS 0028806  3/1978  Japan ..................... 417/63

*Primary Examiner*—William E. Wayner
*Attorney, Agent, or Firm*—Frank J. Dykas; Craig M. Korfanta

[57] ABSTRACT

A slug detection and prevention apparatus 10 and method therefor, which includes a detector 1, high pass filter 2, low pass filter 3, half-wave rectifier 4, comparator 5, and relay 6. Detector 1, being an accelerometer, condenser microphone, or the like, is electrically connected to high pass filter 2. High pass filter 2 is electrically connected to a low pass filter 3 whose output is electrically connected to a half-wave rectifier 4. The output of half-wave rectifier 4 is electrically connected to a comparator 5 which is also electrically connected to a separate voltage source, the magnitude of which corresponds to the energy present in the pass band or a normally operating compressor. The output of comparator 5 is electrically connected to relay 6 which controls the operation of compressor 7. The vibration wave form of compressor 7 is monitored by detector 1 whose signal is filtered to produce an output between apparoximately 80 and 305 hertz. The signal in this pass band is compared to a reference level corresponding to the level of the normally operating compressor for the purpose of slug detection and subsequent compressor deactivations.

22 Claims, 4 Drawing Sheets

COMPRESSOR SLUGGING PROTECTION DEVICE AND METHOD THEREFOR

BACKGROUND OF THE INVENTION

1. Technical Field

This invention generally relates to refrigeration apparatus and in particular relates a method and apparatus for detecting and preventing compressor slugging in a refrigeration compressor.

2. Background Art

Introduction of a hydraulic fluid into an operating refrigeration compressor i.e. "slugging," causes severe damage to the compressor and further results in an inoperative cooler. In the case of food storage coolers, this can result in the loss of thousands of dollars worth of product.

Compressor slugging is normally the result of an over designed cooling system wherein there is insufficient heat to insure complete evaporation of the low pressure liquid to a low pressure gas. If the low pressure liquid enters the refrigeration compressor, the compressor will go hydraulic and is incapable of compressing the fluid. The result is likened to that of the freezing of a piston in an internal combustion engine.

PARKER, U.S. Pat. No. 3,766,747, teaches a method and means for preventing operation of reciprocating refrigerant compressor in the event of the presence of a liquid slug. PARKER uses a state of matter sensor adjacent the entrance to the inlet valve designed to sense the presence of a predetermined quantity of liquid and prevent the operation of the compressor in the presence thereof. PARKER specifically teaches the use of a thermistor as the state of matter sensor which is capable of detecting only temperature differences. Because of the thermal dynamics involved in the workings of a refrigeration compressor, temperature sensing is not adequate as there is not always a sufficient temperature deferential between a low pressure gas and a low pressure liquid in a working refrigeration system.

It has been found through experimentation that a slugging compressor emits unique vibrations and sounds in a specific frequency band of detectable energies. FIG. 1(a) shows the vibration wave form of a normally operating compressor over the frequencies to 0 to approximately 400 hertz. FIG. 16 shows the vibration wave form of a slugging compressor over the same frequency range. Simple comparison of FIGS. 1(a) and (b) shows that over the frequency band of 80 to 305 hertz, there is a detectable and significant increase in the energy of the wave form.

A vibration detection apparatus is taught by A. E. TILLEY ET AL., U.S. Pat. No. 3,269,320, which teaches the use of a geophone to detect the characteristic pounding of a partially dry oil well and enacts subsequent shutdown shortly after detection. The device as taught by TILLEY, is not frequency discriminating and hence when applied to refrigeration compressors would detect all vibrations, not just those of a slugging compressor.

What is needed is a vibration detection apparatus which is capable of detecting a slugging compressor and further of preventing operation of the compressor in the event of a slug detection.

It is therefore an object of this invention to provide an apparatus which is capable of detecting a liquid slug in a refrigeration compressor operable over the entire compressor cycle and is further capable of preventing operation of the compressor in the event of a liquid slug detection.

DISCLOSURE OF INVENTION

These objects are accomplished by the use of a vibration sensor, such as an accelerometer or a condenser microphone, coupled with frequency discriminating circuitry, signal comparison circuitry, and compressor control circuitry. The signal from the detector is routed to a band pass filter, which consists of a high pass filter connected in series with low pass filter. The resultant signal lies within a predetermined frequency band, called the pass band, and is then routed to a half-wave rectifier where it is converted from an alternating signal to a direct current signal. The magnitude of this direct current signal is then compared to the magnitude of a direct current signal which corresponds to a normally operating compressor. If the energy of the detected signal is larger than that of the normally operating signal, the compressor controller circuitry is signaled and disables the compressor.

BEST MODE FOR CARRYING OUT INVENTION

Figure 1A:
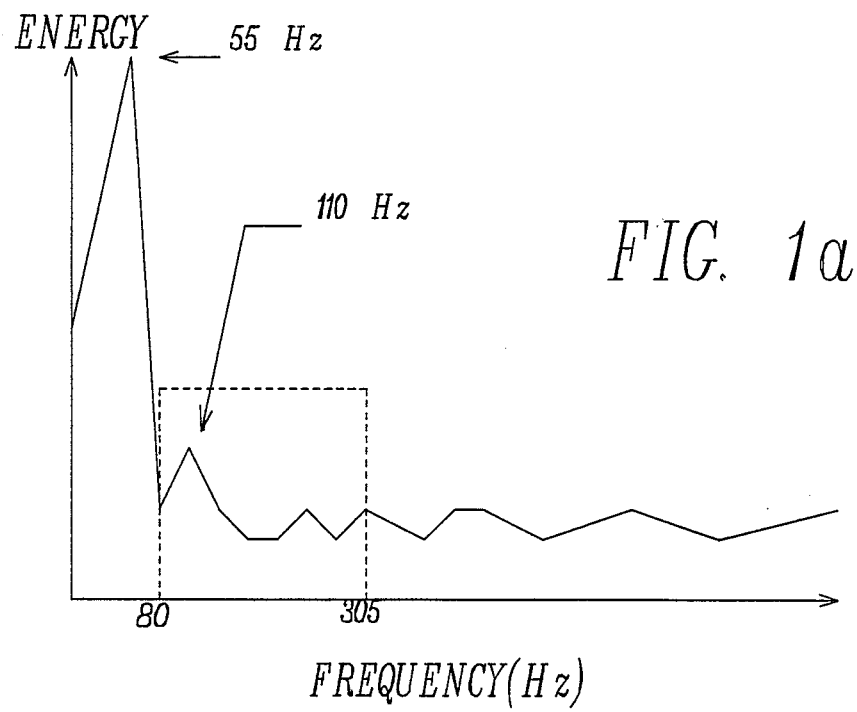
FIG. 1(a) is a graph of the energy of the wave form of a normally operating compressor as a function of frequency.
Figure 1B:
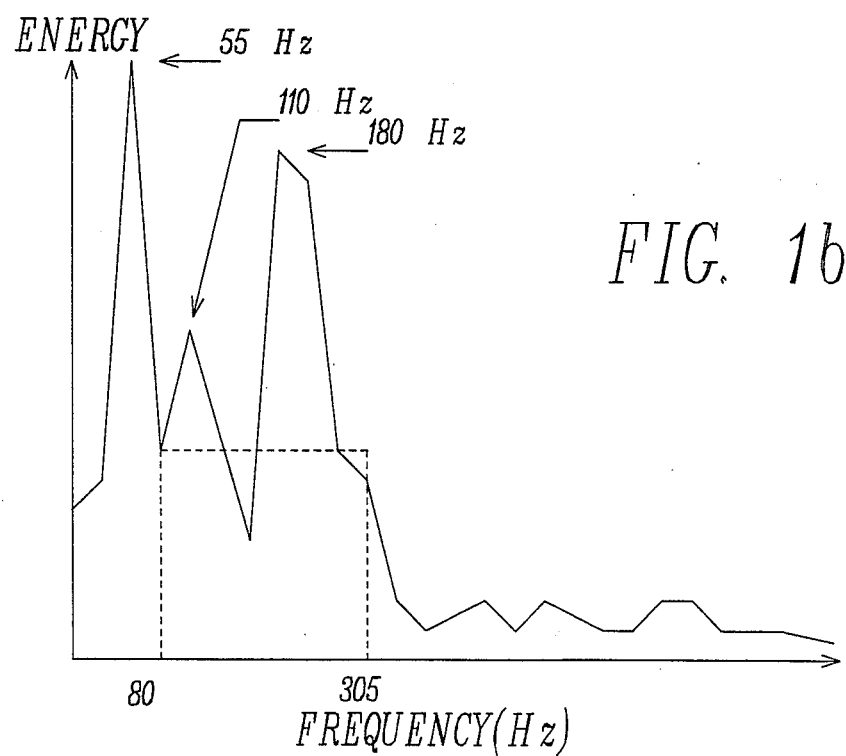
FIG. 1(b) is a graph of the energy of the wave form of a slugging compressor as a function frequency.
Figure 2:
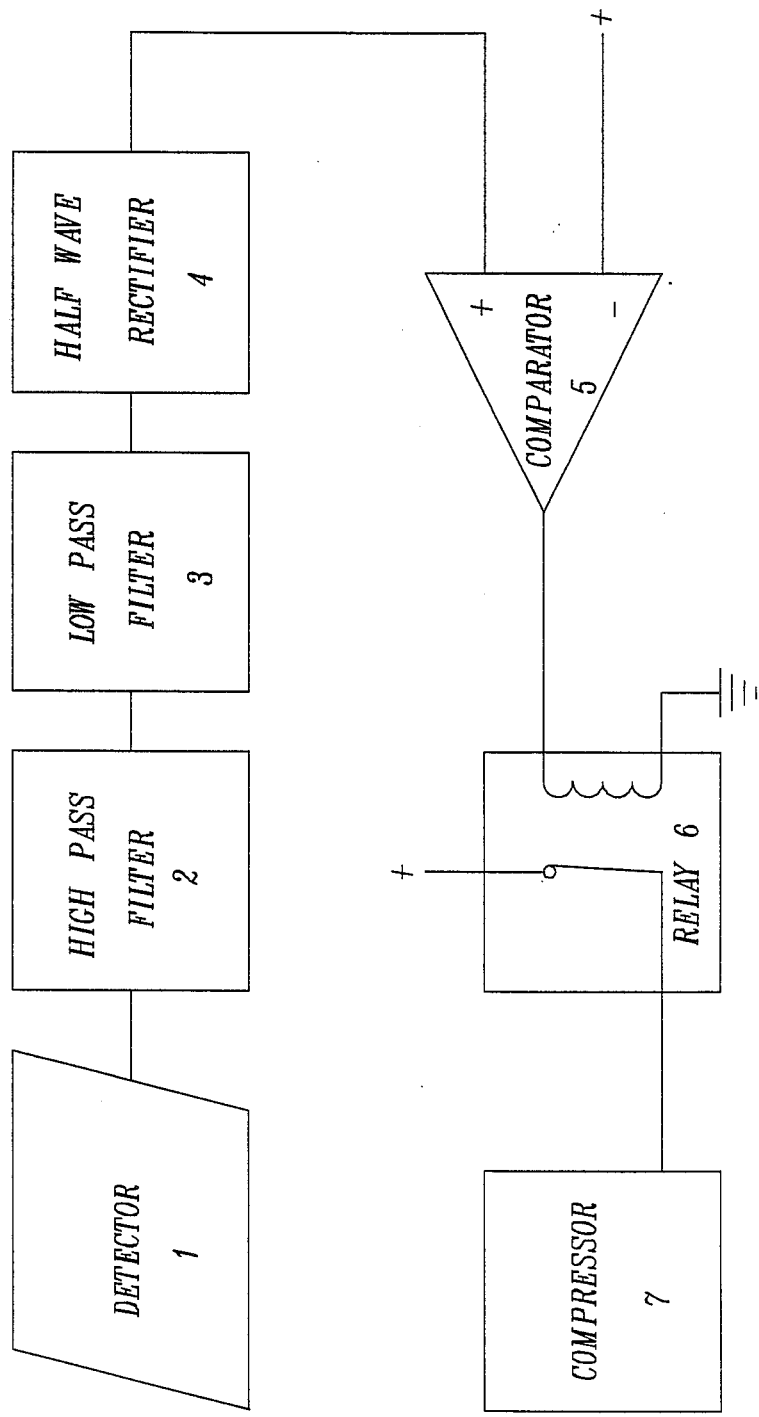
FIG. 2 is a block diagram of a slug detection circuit.

FIG. 2 shows a block diagram of a slug detection and prevention apparatus 10. Detector 1, being an accelerometer, condenser microphone, or the like is electrically connected to high pass filter 2. Detector 1 is positioned in the general vicinity of a refrigeration compressor 7 and produces a signal which corresponds to the vibrations and sounds of compressor 7. High pass filter 2 receives the signal from detector 1 and filters out a portion of the signal below a predetermined low frequency cut off point. A low pass filter 3 is electrically connected to high pass filter 2 and receives the partially filtered signal therefrom. Low pass filter 3 subsequently filters out a second portion of the signal which lies above a predetermined high frequency cut off point. In this preferred embodiment the low frequency cut off point occurs generally at 80 hertz while the high frequency cut off point occurs generally at 305 hertz. A half-wave rectifier 4 is electrically connected to the low pass filter 3 and receives the filtered signal therefrom. Half-wave rectifier 4 converts the signal contained within the frequency pass band to a direct current signal, the magnitude of which corresponds to the energy of the signal within the pass band. A comparator 5 is electrically connected to the half-wave rectifier 4 and a separate voltage source, the magnitude of which corresponds to the energy present in the pass band of a normally operating compressor. Comparator 5 compares the rectified signal with the reference signal to determine the presence of a slug condition. Compressor control circuitry, in this case relay 6, is electrically connected to the output of comparator 5 and receives a slug detection signal therefrom in the event of a valid slug detection. Relay 6 is connected between a current source and compressor 7. In this particular embodiment relay 6 is a normally closed relay. Because a valid slug detection signal is, in this embodiment, active high, relay 6 remains closed until a valid slug detection signal is applied.

Figure 3:
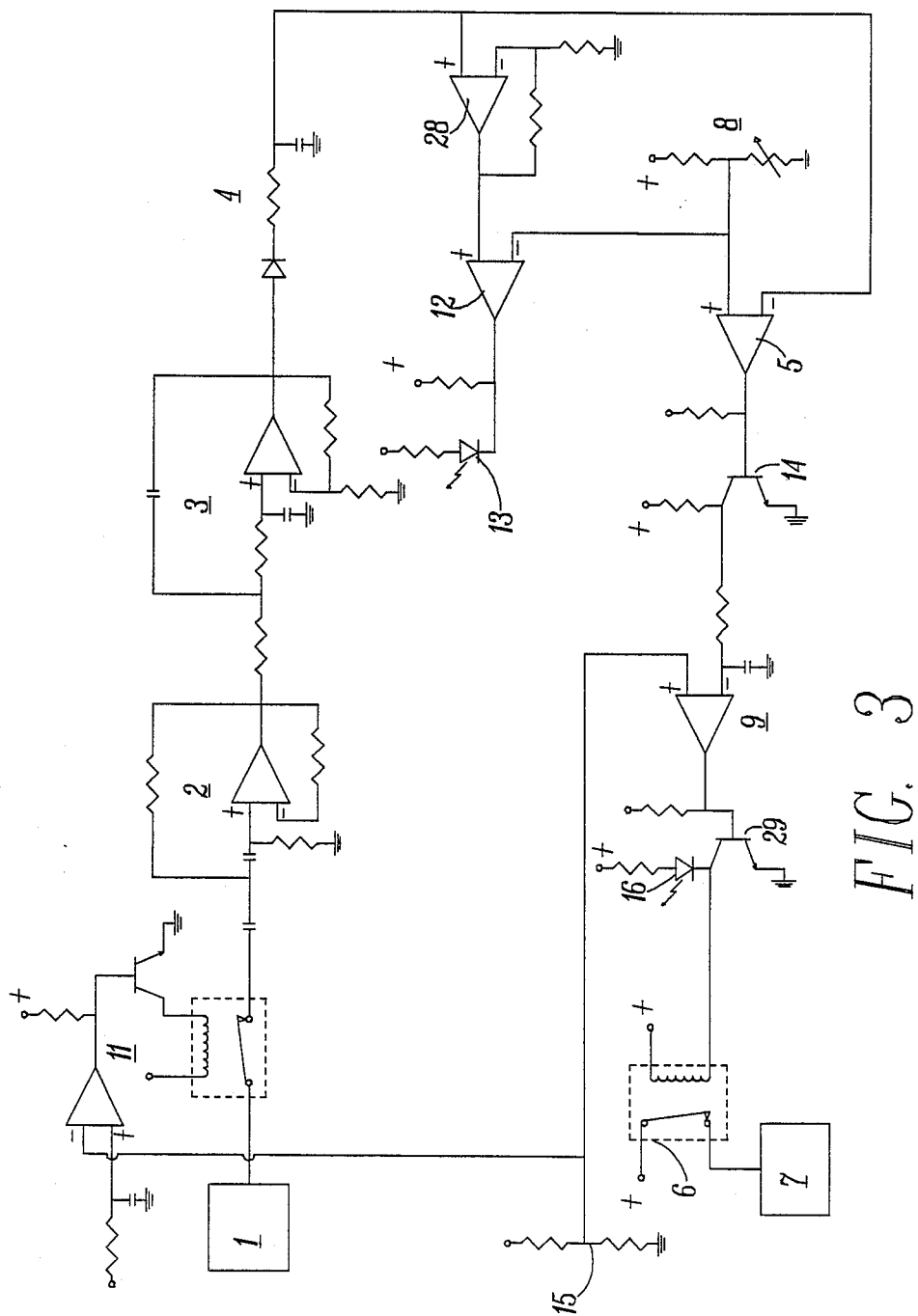
FIG. 3 is a schematic diagram of a first embodiment of a slug detection circuit.

Referring now to FIG. 3, compressor slug detection and prevention apparatus 10 is shown in schematic form. In this particular embodiment, time delay circuitry 11 is added and provides a small time delay upon compressor start up to avoid an invalid slug detection due to start up vibrations. Detector 1 is connected through the relay of delay circuitry 11 to high pass filter 2. High pass filter 2 is a second order Butterworth high pass filter and has a low frequency cutoff of approximately 80 Hz. High pass filter 2 is electrically connected to low pass filter 3 which is a second order Butterworth filter and has a high frequency cutoff point of approximately 305 Hz. Half-wave rectifier 4 is electrically connected to low pass filter 3 and consists of a diode, resistor, and capacitor combination.

The output of half-wave rectifier 4 is electrically connected to the inverting input of comparator 5 and the non-inverting input of non-inverting amplifier 28. The output of non-inverting amplifier 28 is electrically connected to the now inverting input of a second comparator 12. The non-inverting input of comparator 5 and the inverting input of comparator 12 are electrically connected to a center tap on voltage divider 8, consisting of a series combination of a resistor and potentiometer. The potentiometer is used to set the operating reference level, which corresponds to a voltage level representative of the energy contained in the pass band of a normally operating compressor. Comparator 12 compares the output of voltage divider 8 and non-inverting amplifier 28 and will cause LED 13 not to be lighted until the voltage of voltage divider 8 exceeds the output of non-inverting amplifier 28. This is the voltage level at which the normal operating reference level is set and corresponds to a level slightly higher than the actual level, thereby providing for a margin of error.

Transistor 14 is electrically connected at its base to the output of comparator 5. When the compressor is operating normally, the output of comparator 5 should be positive, causing transistor 14 to be in a conducting state. However, if the voltage at the inverting input of comparator 5 should exceed the reference level at the non-inverting input, the output of comparator 5 will become ground, causing transistor 14 to turn off. This occurs during a slug detection. During this condition, there is a higher voltage at the collector of transistor 14 and consequently, the voltage at the inverting input of the comparator contains in slug verification circuitry 9, exceeds that of the non-inverting input, causing the output to go high. Slug verification circuitry 9 consists of an operational amplifier configured in a timing configuration very similar to that of time delay circuitry 11. A time delay reference signal is provided to the inverting inputs of the comparators of the slug verification circuitry 9 and time delay circuitry 11, by a second voltage divider, namely time delay reference divider 15. Time delay reference divider 15 consists of a pair of serially connected resistors. If the slug detection signal at the non-inverting input of slug verification circuitry 9 remains at a level above the time delay reference level, the comparator will switch its output high, causing transistor 29 to conduct and slug detection LED 16 to light and relay 6 to activate, thereby disabling compressor 7.

It should be readily apparent that there are many possible circuit configurations for slug detection and prevention apparatus 10. For instance, high and low pass filters 3 do not necessarily need to be second order Butterworth filters as other active or passive filters could suffice.

Figure 4:
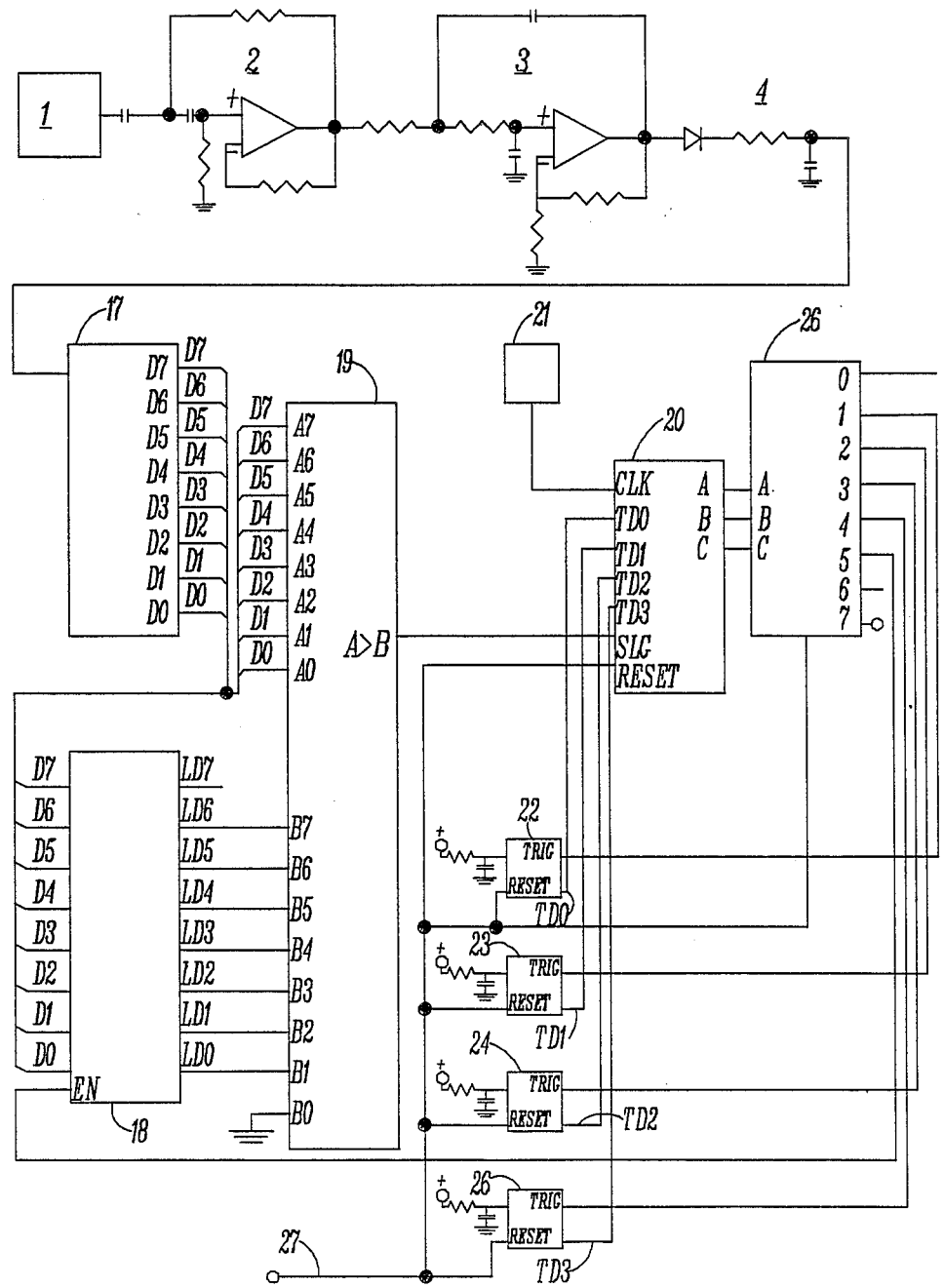
FIG. 4 is a schematic diagram of a second embodiment of a slug detection circuit.

One other possible circuit configuration is shown in FIG. 4 and has detector 1 connected directly to second order Butterworth high pass filter 2 which is subsequently connected to second order Butterworth low pass filter 3 and then to half-wave rectifier 4. Timing delay circuitry 11 of the first embodiment shown in FIG. 3, has been eliminated in this second embodiment and replaced by digital circuitry yet to be explained. Likewise, all the circuitry "down the wire" of half-wave rectifier 4, of the first embodiment, has been replaced by digital components. In this second embodiment, halfwave rectifier 4 has its output connected to an analog to digital (A/D) converter 17. A/D converter 17 is an eight-bit A/D and has its eight outputs, D0 through D7 connected to eight corresponding inputs on latch 18 and the eight inputs, A0 through A7 on comparator 19. Outputs LD0 through LD6 of latch 18 are connected to inpu 1 through 7 on comparator 19. Output LD7 of latch 18, is left floating, while input B0 of comparator 19 is grounded. This particular connection configuration, provides the comparator 19 with a latch value which is twice that of the actual latch value, thereby providing a margin of error. Comparator 19 compares the digital values at its inputs A and B and will generate an active signal at its output when the value at A exceeds that of B. Therefore, the A inputs are used to monitor the ongoing signal, while the B inputs are used to monitor the reference signal stored in latch 18. The output of comparator 19 is connected to a programmed array logic (PAL) device 20. PAL 20 has a state machine incorporated therein and is driven by oscillator 21 connected to its clock (CLK) input. PAL 20 is responsible for implementing all of the required timing delays, automatic reference settings, reset, and control functions for compressor slug detection and prevention apparatus 10.

Four timing IC's, in this particular embodiment 556 timers 22, 23, 24 and 25, are configured to provide a 200 ms time delay, 20 second time delay, 120 second time delay, and a 2 second time delay, respectively. The output of 556 timer 22, TD0, is connected to a TD0 input of PAL 20. Likewise, the outputs of 556 timers 23, 24 and 25, being TD1, TD2 and TD3, are connected to their respective inputs TD1, TD2 and TD3 on PAL 20. Outputs A, B, and C of PAL 20 are connected to the inputs A, B, and C of 3 to 8 decoder 26. 3 to 8 decoder 26 has its output 0 floating, output 1 connected to the trigger input on 556 timer 22, output 2 connected to the trigger input of 556 timer 23, output 3 connected to the trigger input of 556 timer 24, and output 4 connected to the trigger input of 556 timer 25. Output 5 of 3 to 8 decoder 26 corresponds to a latch enable output and is connected to the enable input of latch 18. Output 6 of 3 to 8 decoder 26 is left floating and output 7 corresponds to a slug detection output. A reset line 27 is provided and is connected to the reset inputs of timers 22, 23, 24, and 25 and to PAL 20 and 3 to 8 decoder 26. The reset capability is provided to reset the system after a slug detection shut down and subsequent corrective measures have been implemented. Output 7 of 3 to 8 decoder 26 is connected to relay control circuitry, which controls compressor 7, both of which are not shown in this figure but are shown in FIGS. 2 and 3.

Upon reset PAL 20 activates 556 timer 22 which corresponds to a 200 ms time delay. At the end of this time delay, PAL 20 will activate a second time delay of 20 seconds, which is provided by 556 timer 23. At the end of this time delay, PAL 20 will enable latch 18, via output 5 on 3 to 8 decoder 26. Latch 18 then latches a base line voltage value which corresponds to the energy present in the pass band. PAL 20 then monitors its slug input which is connected to the output of comparator 19. Comparator 19 compares the current value of A/D converter 17 with a value which is twice that of the latched base line value. If the value at inputs A of comparator 19 exceeds that of the value of inputs B, comparator 19 will generate a slug signal at its output. Upon detection by PAL 20 of the slug signal, PAL 20 will activate a 2 second time delay provided by 556 timer 24. PAL 20 will continue to monitor its slug input signal during this 2 second time delay to insure against nuisance shut downs. If at the end of this 2 second time delay there is still a slug signal present at the slug input of PAL 20, PAL 20 will generate a valid slug detection signal at output 7 of 3 to 8 decoder 26.

During the course of normal operation of a typical refrigeration system, the compressor is stopped and started to regulate the temperature. Upon restart, the old baseline value is still contained within latch 18, PAL 20 then activates a 120 second time delay, provided by 556 timer 25. At the end of this time delay it then latches a new base line value. This is to help insure that an accurate reference level is maintained and represents the normal operating level of the compressor. This also helps account for extraneous rattles and vibrations as the machinery ages and wears.

A third embodiment, which is not illustrated, consists of a circuit for simply comparing the root mean square (RMS) value of the energy over the entire frequency range of the detector. It has been observed, through experimentation, that there is sufficient energy in the output wave form of the detector during slugging for detecting by a simple RMS comparison, thereby eliminating the high and low pass filters. The circuitry, in its most basic configuration, consists of a detector, an RMS IC and supporting circuitry, a reference level source, and a comparator.

While there is shown and described the present preferred embodiment of the invention, it is to be distinctly understood that this invention is not limited thereto but may be variously embodied to practice within the scope of the following claims.

We claim:

1. A method for preventing damage to a compressor due to slugging which comprises the steps of:
   electrically detecting vibrations due to a slugging compressor;
   converting said vibrations into corresponding electrical signals;
   limiting the frequency band of said electrical signals to a predetermined pass band;
   rectifying and filtering said pass band to produce a direct current electrical signal which is proportional to the energy of the signal in said pass band;
   comparing said direct current signal to a reference signal which corresponds to the energy of the pass band of a normally operating compressor to identify slugging vibrations; and
   disabling said compressor responsive to said slugging vibration detection.

2. A method for detecting compressor slugging which comprises the steps of:
   detecting compressor vibrations;
   converting said vibrations into corresponding electrical signals;
   limiting the frequency band of said electrical signals to a predetermined pass band;
   rectifying and filtering said pass band to produce a direct current electrical signal which is proportional to the energy of the signal in said pass band;
   comparing said direct current signal to a reference signal which corresponds to the energy of the pass band of a normally operating compressor.

3. The method of claim 2 further comprising the step of timing the state of a signal resulting from said comparison step in the event of a slug detection for the purpose of verifying a true slug condition.

4. A method for detecting compressor slugging which comprises the steps of:
   monitoring the sounds made by a compressor;
   converting said sounds into corresponding electrical signals;
   limiting the frequency band of said electrical signals to a predetermined pass band;
   rectifying and filtering said pass band to produce a direct current electrical signal which is proportional to the energy of the signal in said pass band;
   comparing said direct current signal to a reference signal which corresponds to the energy of the pass band of a normally operating compressor.

5. The method of claim 4 further comprising the step of timing the state of a signal resulting from said comparison step in the event of a slug detection for purposes of verifying a true slug condition.

6. An apparatus for preventing damage to a compressor due to slugging which comprises:
   means for detecting compressor vibrations and for producing an electrical signal which corresponds to said vibrations;
   means for limiting the frequency band of electrical signals produced by said detecting and signal producing means;
   means for converting said frequency limited signal to a direct current signal whose magnitude represents the energy of the signal contained within said frequency band;
   means for producing a direct current reference signal whose magnitude represents the energy contained within said frequency band of a signal corresponding to the vibrations of a normally operating compressor;
   means for comparing first said direct current signal with said reference direct current signal to determine a slug condition;
   means for verifying a detected slug condition;
   means for disabling said compressor responsive to a verified slug condition.

7. The apparatus of claim 6 wherein the vibration detection means comprises a vibration transducer.

8. The apparatus of claim 6 wherein the vibration detection means comprises an accelerometer.

9. The apparatus of claim 6 wherein the frequency limiting means comprises:
   a second order Butterworth high pass filter operably connected to said detection and signal production means;

a second order Butterworth low pass filter operably connected to said high pass filter.

10. The apparatus of claim 6 wherein the converting means comprises a half-wave rectifier operably connected to said frequency limiting means.

11. The apparatus of claim 6 wherein the reference signal producing means comprises:
   a current source;
   a potentiometer operably connected to said current source.

12. The apparatus of claim 6 wherein the reference signal producing means comprises:
   an analog to digital converter integrated circuit operably connected to said converting means;
   a digital latch integrated circuit operably connected to said analog to digital converter for storing a digital reference signal;
   a programmable array logic device operably connected to said digital latch for enabling and disabling said latch.

13. The apparatus of claim 6 wherein the comparing means comprises an operational amplifier being in a comparator configuration and operably connected to said reference signal producing means and said converting means.

14. The apparatus of claim 6 wherein the comparing means comprises a multi-bit digital comparator integrated circuit operably connected to said converting means and said reference signal producing means.

15. The apparatus of claim 6 wherein the verification means comprises a time delay circuit responsive to said comparing means for preventing disablement of said compressor in the case of an invalid slug detection.

16. The apparatus of claim 6 wherein the verification means comprises:
   a programmable array logic device operably connected to said comparing means for generating a valid slug detection signal;
   a timing integrated circuit operably connected to said programmable array logic device for generating a time delay for timing the duration of a slug signal generated by said comparing means.

17. The apparatus of claim 6 wherein the disabling means comprises a relay responsive to said verification means and operably connected between a current source and said compressor, for disabling said compressor in the event of a slug detection.

18. An apparatus for preventing damage to a compressor due to slugging which comprises:
   an accelerometer for detecting compressor vibrations and for producing an electrical signal which corresponds to said vibrations;
   a high pass filter operably connected to said accelerometer, for filtering out signal frequencies below a predetermined frequency;
   a low pass filter operably connected to said high pass filter, for filtering out signal frequencies above a predetermined frequency;
   a half-wave rectifier operably connected to said low pass filter for converting the filtered signal to a direct current signal which corresponds to the energy of the filtered signal;
   a reference voltage source which corresponds to the energy of a signal in the same frequency band as said filtered signal as would be produced by a normally operating compressor;
   a comparator operably connected to said half-wave rectifier and said reference voltage source for comparing relative signal levels;
   a time delay circuit operably connected to said comparator for verifying a slug detection;
   a relay operably connected between a current source and said compressor and responsive to said verified slug detection for disabling said compressor in the event of a slug detection.

19. An apparatus for preventing damage to a compressor due to slugging which comprises:
   an accelerometer for detecting compressor vibrations and for producing and electrical signal which corresponds to said vibrations;
   a high pass filter operably connected to said accelerometer, for filtering out signal frequencies below a predetermined frequency;
   a low pass filter operably connected to said high pass filter, for filtering out signal frequencies above a predetermined frequency;
   a half-wave rectifier operably connected to said low pass filter for converting the filtered signal to a direct current signal which corresponds to the energy of the filtered signal;
   an analog to digital converter integrated circuit operably connected to said half-wave rectifier for converting said direct current signal to a multi-bit digital signal whose magnitude represents the level of said direct current signal;
   a digital latching integrated circuit operably connected to said analog to digital converter for storing a multi-bit digital reference signal which corresponds to the energy in the pass band of a normally operating compressor;
   a multi-bit digital comparator integrated circuit operably connected at its inputs to said analog to digital converter and said digital latch for comparing the multi-bit digital signal of said analog to digital converter to the multi-bit reference signal of said digital latch for the purpose of slug detection;
   a programmable array logic device operably connected to said digital comparator and said digital latch for verifying a slug detection signal and controlling said latch;
   a plurality of timing integrated circuits operably connected to said programmable array logic device for generating various length time delays, said timing integrated circuits further being responsive to said programmable array logic device;
   a digital decoder integrated circuit operably connected to said programmable array logic device for decoding its output and distributing control signals therefrom;
   a relay operably connected between a current source and said compressor, and responsive and connected to said decoder, for disabling said compressor in the event of a verified slug detection.

20. An apparatus for preventing damage to a compressor due to slugging which comprises:
   a microphone for detecting compressor sounds and for producing an electrical signal which corresponds to said sounds;
   a high pass filter operably connected to the microphone, for filtering out signal frequencies below a predetermined frequency;
   a low pass filter operably connected to said high pass filter, for filtering out signal frequencies above a predetermined frequency;

a half-wave rectifier operably connected to said low pass filter for converting the filtered signal to a direct current signal which corresponds to the energy of the filtered signal;

a reference voltage source which corresponds to the energy of a signal in the same frequency band as said filtered signal as would be produced by a normally operating compressor;

a comparator operably connected to said half-wave rectifier and said reference voltage source for comparing relative signal levels;

a time delay circuit operably connected to said comparator for verifying a slug detection;

a relay operably connected between a current source and said compressor and responsive to said verified slug detection for disabling said compressor in the event of a slug detection.

21. An apparatus for preventing damage to a compressor due to slugging which comprises:

a microphone for detecting compressor sounds and for producing an electrical signal which corresponds to said sounds;

a high pass filter operably connected to said accelerometer, for filtering out signal frequencies below a predetermined frequency;

a low pass filter operably connected to said high pass filter, for filtering out signal frequencies above a predetermined frequency;

a half-wave rectifier operably connected to said low pass filter for converting the filtered signal to a direct current signal which corresponds to the energy of the filtered signal;

an analog to digital converter integrated circuit operably connected to said half-wave rectifier for converting said direct current signal to a multi-bit digital signal whose magnitude represents the level of said direct current signal;

a digital latching integrated circuit operably connected to said analog to digital converter for storing a multi-bit digital reference signal which corresponds to the energy in the pass band of a normally operating compressor;

a multi-bit digital comparator integrated circuit operably connected at its inputs to said analog to digital converter and said digital latch for comparing the multi-bit digital signal of said analog to digital converter to the multi-bit reference signal of said digital latch for the purpose of slug detection;

a programmable array logic device operably connected to said digital comparator and said digital latch for verifying a slug detection signal and controlling said latch;

a plurality of timing integrated circuits operably connected to said programmable array logic device for generating various length time delays, said timing integrated circuits further being responsive to said programmable array logic device;

a digital decoder integrated circuit operably connected to said programmable array logic device for decoding its output and distributing control signals therefrom;

a relay operably connected between a current source and said compressor, and responsive and connected to said decoder, for disabling said compressor in the event of a verified slug detection.

22. A method for preventing damage to a compressor due to slugging which comprises the steps of: electrically monitoring the sound made by a compressor for slugging sounds; disable said compressor responsive to said slugging sounds wherein the monitoring step further comprises: converting said sounds into corresponding electrical signals; limiting the frequency band of said electrical to a predetermined pass band; rectifying and filtering said pass band to produce a direct current electrical signal which is proportional to the energy of the signal in said pass band; comparing said direct current signal to a reference signal which corresponds to the energy of the pass band of normally operating compressor.

* * * * *